(12) United States Patent
Wang et al.

(10) Patent No.: US 12,345,150 B2
(45) Date of Patent: Jul. 1, 2025

(54) REVERSE TIME MIGRATION IMAGING METHOD FOR CASED-HOLE STRUCTURE BASED ON ULTRASONIC PITCH-CATCH MEASUREMENT

(71) Applicant: University of Electronic Science and Technology of China, Chengdu (CN)

(72) Inventors: Hua Wang, Chengdu (CN); Meng Li, Chengdu (CN)

(73) Assignee: University of Electronic Science and Technology of China, Chengdu (CN)

( * ) Notice: Subject to any disclaimer, the term of this patent is extended or adjusted under 35 U.S.C. 154(b) by 269 days.

(21) Appl. No.: 17/962,511

(22) Filed: Oct. 9, 2022

(65) Prior Publication Data
US 2023/0033271 A1    Feb. 2, 2023

(30) Foreign Application Priority Data
Oct. 9, 2021    (CN) .......................... 202111175499.6

(51) Int. Cl.
| | |
|---|---|
| *E21B 47/005* | (2012.01) |
| *E21B 47/14* | (2006.01) |
| *G01V 1/50* | (2006.01) |

(52) U.S. Cl.
CPC .............. *E21B 47/005* (2020.05); *G01V 1/50* (2013.01); *E21B 47/14* (2013.01); *G01V 2210/6242* (2013.01)

(58) Field of Classification Search
None
See application file for complete search history.

(56) References Cited

U.S. PATENT DOCUMENTS

| | | | | |
|---|---|---|---|---|
| 5,134,578 A | * | 7/1992 | Garverick .......... | G05B 19/0423 708/650 |
| 6,018,499 A | * | 1/2000 | Sethian .................. | G01V 1/305 702/14 |

(Continued)

FOREIGN PATENT DOCUMENTS

| | | |
|---|---|---|
| CN | 103244104 A | 8/2013 |
| CN | 110806601 A | 2/2020 |

(Continued)

OTHER PUBLICATIONS

Gazdag, Jenö. "Wave equation migration with the phase-shift method." Geophysics 43.7 (1978): 1342-1351. (Year: 1978).*

(Continued)

*Primary Examiner* — Isam A Alsomiri
*Assistant Examiner* — Jonathan D Armstrong

(57) ABSTRACT

A reverse time migration imaging method for cased-hole based on ultrasonic pitch-catch measurement, including: calculating a theoretical dispersion curve; expanding original Lamb data of two receivers into array waveform data based on phase-shift interpolation; establishing a two-dimensional migration velocity model including density, P-wave velocity and S-wave velocity of a target area; generating and storing a forward propagating ultrasonic wavefield for each time step; reversing a time axis; generating and storing a reversely propagating ultrasonic Lamb wavefield for the two receivers after phase-shift interpolation; calculating envelopes of the forward propagating ultrasonic Lamb wavefield and the reversely propagating ultrasonic Lamb wavefield; applying a zero-lag cross-correlation imaging condition to obtain reverse time migration imaging results; and applying Laplace filtering to suppress low-frequency imaging noises in the imaging results.

7 Claims, 8 Drawing Sheets

(56) References Cited

U.S. PATENT DOCUMENTS

| | | | | |
|---|---|---|---|---|
| 6,021,094 | A * | 2/2000 | Ober | G01V 1/28 367/63 |
| 6,324,478 | B1 * | 11/2001 | Popovici | G01V 1/305 702/18 |
| 10,241,222 | B2 * | 3/2019 | Jiang | G06F 30/20 |
| 2005/0090989 | A1 * | 4/2005 | Kelly | G01V 1/28 702/14 |
| 2010/0030479 | A1 * | 2/2010 | Higginbotham | G01V 1/303 702/18 |
| 2010/0054082 | A1 * | 3/2010 | McGarry | G01V 1/28 367/53 |
| 2010/0114494 | A1 * | 5/2010 | Higginbotham | G01V 1/28 702/18 |
| 2010/0118651 | A1 * | 5/2010 | Liu | G01V 1/34 367/50 |
| 2012/0026833 | A1 * | 2/2012 | Soubaras | G01V 1/282 367/50 |
| 2012/0095690 | A1 * | 4/2012 | Higginbotham | G01V 1/28 702/14 |
| 2012/0116680 | A1 * | 5/2012 | Fei | G01V 1/288 702/9 |
| 2015/0235081 | A1 * | 8/2015 | Jiang | G06V 30/422 382/109 |
| 2017/0184748 | A1 * | 6/2017 | Baydin | G01V 1/282 |
| 2018/0038836 | A1 * | 2/2018 | Senderos | G01N 29/50 |
| 2021/0278558 | A1 * | 9/2021 | Zhang | G01V 1/345 |
| 2022/0283329 | A1 * | 9/2022 | Zwartjes | G01V 1/282 |
| 2022/0413172 | A1 * | 12/2022 | Gashawbeza | G01V 1/303 |
| 2023/0258604 | A1 * | 8/2023 | Zhao | G01N 29/46 702/190 |

FOREIGN PATENT DOCUMENTS

| | | |
|---|---|---|
| EP | 3879311 B1 | 7/2022 |
| GB | 2525340 A | 10/2015 |

OTHER PUBLICATIONS

Du, Qi-Zhen, et al. "A study of perfectly matched layers for joint multicomponent reverse-time migration." Applied Geophysics 7.2 (2010): 166-173. (Year: 2010).*

Maeika, L., and L. Draudvilienė. "Analysis of the zero-crossing technique in relation to measurements of phase velocities of the Lamb waves." Ultragarsas/Ultrasound 65.2 (2010): 7-12. (Year: 2010).*

Xie, Jiangang, et al. "Reverse time migration using the pseudospectral time-domain algorithm." Journal of Computational Acoustics 24.02 (2016): 1650005. (Year: 2016).*

Nguyen, Luan T., Georg K. Kocur, and Erik H. Saenger. "Defect mapping in pipes by ultrasonic wavefield cross-correlation: a synthetic verification." Ultrasonics 90 (2018): 153-165. (Year: 2018).*

Ma, Xiao, Yangjia Li, and Jiaxing Song. "A stable auxiliary differential equation perfectly matched layer condition combined with low-dispersive symplectic methods for solving second-order elastic wave equations." Geophysics 84.4 (2019): T193-T206. (Year: 2019).*

Bao, Yu, et al. "Elastic wave pre-stack reverse-time migration based on the second-order P-and S-wave decoupling equation." Journal of Geophysics and Engineering 19.5 (2022): 1221-1234. (Year: 2022).*

Gao, Yingjie, and Meng-Hua Zhu. "Application of the Reflectionless Discrete Perfectly Matched Layer for Acoustic Wave Simulation." Frontiers in Earth Science 10 (2022): 883160. (Year: 2022).*

Shi, Shaopeng, et al. "Ultrasonic pitch-catch measurement wavefield analysis and casing reflection suppression." Geoenergy Science and Engineering 234 (2024): 212591. (Year: 2024).*

Wang, Hua, Guo Tao, and Xuefeng Shang. "Understanding acoustic methods for cement bond logging." The Journal of the Acoustical Society of America 139.5 (2016): 2407-2416. (Year: 2016).*

* cited by examiner

REVERSE TIME MIGRATION IMAGING METHOD FOR CASED-HOLE STRUCTURE BASED ON ULTRASONIC PITCH-CATCH MEASUREMENT

CROSS-REFERENCE TO RELATED APPLICATIONS

This application claims the benefit of priority from Chinese Patent Application No. 202111175499.6, filed on Oct. 9, 2021. The content of the aforementioned application, including any intervening amendments thereto, is incorporated herein by reference in its entirety.

TECHNICAL FIELD

This application relates to the evaluation of cementing quality, and more particularly to a reverse time migration imaging method for cased-hole structure based on ultrasonic pitch-catch measurement.

BACKGROUND

During oil & gas development, geothermal production, groundwater exploitation, gas storage construction and carbon dioxide geological storage, it is required to place a casing in the wellbore, and inject cement between the casing and the borehole structure for cementing, so as to ensure the wellbore integrity and achieve the interlayer and hydraulic isolation. The annulus between formation and the steel casing is generally filled with different types of cement for borehole structure protection and zonal isolation between the formation strata at different depths. Structurally, the casing corrosion and the cement bond quality outside the casing will significantly affect oil & gas production. Therefore, the cementing quality not only affects the production efficiency, but also relates to the ecological environment, exploitation safety and service life of the oil-gas well. In view of this, imaging the annulus outside the casing, especially the cement-formation interface, is of great importance to determine the casing damage and cement bond defect.

As one of the key technologies for cementing quality evaluation, the ultrasonic pitch-catch measurement employs one single oblique incidence transmitter with two receivers, where a certain incident angle is selected to excite low-order anti-symmetric A0-mode Lamb wave in the range of 200-500 kHz in the casing to cover a large thickness range of the casing. During the propagation in the casing, the A0-mode wave will leak into the medium between the casing and formation. Since the energy leakage varies in different mediums, the attenuation information of quasi-transverse wave in the mediums is obtained by measuring the attenuation of A0-mode head wave between the two receivers. Since the A0-mode attenuation is strongly associated with properties of the coupling material outside the casing, it is possible to distinguish lightweight cement from borehole fluid by measuring the attenuation. In addition, the A0-mode wave leaking from the casing into the annulus is reflected into the well by the cement-formation interface to form a third interface echo (TIE) with a visible amplitude. The borehole geometry and position of the casing in the well can be determined and imaged by detecting the reflection of A0-mode wave leaking from the casing on the borehole structure.

In practice, the conventional ultrasonic Lamb data processing methods fail to provide complete information of the second and third acoustic interfaces of the borehole structure, and can only qualitatively evaluate the attenuation in the medium behind the casing.

In one aspect, the casing or tool eccentricity will affect the amplitude of the A0 reflection wave at the cement-formation interface, such that it fails to directly observe the cement bond conditions of the cement-formation interface from the waveform data.

In the other aspect, the complex downhole environment makes it impossible to perform time-position conversion according to data of obliquely incident ultrasonic Lamb wave, and it is difficult to convert the signal of the A0 reflection wave in the time domain into a distance from the well axis, such that the A0 reflection wave cannot be converged, and the exact location of the borehole structure acoustic interfaces (the borehole structure-cement interface, and the cement-formation interface) cannot be determined.

Reverse time migration (RTM) was first proposed by Whitemore to migrate and converge the reflections and diffraction to their real positions in the active seismic exploration data processing. Based on the two-way wave equation, this method is not limited by the inclination angle, and can process the waves containing effective imaging information, such as reflected waves, transmitted waves, prismatic waves, turning waves, and multiples. In addition, this method has satisfactory imaging accuracy, strong adaptability in complex structures, and excellent imaging performance especially for strong reflectors. In recent years, this method has been gradually applied to the acoustic reflection image logs for imaging the near-borehole geological structures. Compared with the conventional migration method, the imaging results obtained by the RTM algorithm are more consistent with the actual measurement data, so as to better avoid the influence of the wellbore.

However, considering that the A0-mode wave leakage generated by the oblique incidence of the ultrasonic Lamb wave has a certain frequency dispersion, the direct application of the conventional RTM and imaging conditions will lead to imaging artifacts of interfaces at multiple positions and failure in migration of the reflections and diffraction. Additionally, regarding the tool geometry applied in the ultrasonic pitch-catch measurement strategies, only two waveforms (near and far receiver) are recorded for each depth, such that the RTM algorithm cannot be directly used in the ultrasonic pitch-catch measurement due to the inadequate wavefield sampling.

SUMMARY

An objective of this application is to provide a reverse time migration imaging method for a cased-hole structure based on ultrasonic pitch-catch measurement, where the ultrasonic Lamb wave data of two conventional receivers are interpolated into array waveforms by phase-shaft interpolation.

We proposed a modified imaging condition by using the zero-lag cross correlation of the envelope of forward and backward ultrasonic Lamb wavefields to suppress the image artifact caused by dispersion. The envelope can be calculated using the Hilbert transform. The images of cased-hole structure can be further applied to evaluate the quality of cement bond between casing and formation.

Technical solutions of this application are described as follows.

This application provides a reverse time migration imaging method for cased-hole structure based on ultrasonic pitch-catch measurement, comprising:

(S1) inputting original ultrasonic Lamb waveform data and related parameter files; calculating a theoretical dispersion curve of A0-mode waveforms; and expanding original Lamb data of two receivers into array waveform data based on phase-shift interpolation;

(S2) according to background information, establishing a two-dimensional migration velocity model including density, P-wave velocity and S-wave velocity of a target area;

(S3) based on two-dimensional high-order staggered grid finite difference and non-split perfectly matched layer, generating and storing a forward propagating ultrasonic Lamb wavefield for each time step;

(S4) reversing a time axis; generating and storing a reversely propagating ultrasonic Lamb wavefield;

(S5) based on Hilbert transform, calculating an envelope of the forward propagating ultrasonic Lamb wavefield and an envelope of the reversely propagating ultrasonic Lamb wavefield;

(S6) applying a zero-lag cross-correlation imaging condition to the forward propagating ultrasonic Lamb wavefield and the reversely propagating ultrasonic Lamb wavefield to obtain reverse time migration imaging results for ultrasonic pitch-catch measurement; and (S7) applying Laplace filtering to suppress low-frequency imaging noises in the reverse time migration imaging results.

In an embodiment, in step (S1), the theoretical dispersion curve of the A0-mode waveforms is calculated according to borehole fluid properties, casing thickness, casing elastic parameters and central frequency recorded in the related parameter files; based on A0's phase velocity, a waveform propagating forward or backward from one of the two receivers to a certain distance is calculated by using a phase shift method through the following equation:

$$g(t) = \int F(w)H(w)e^{-jwt}dw;$$
$$H(w) = e^{-jk(w)x_0}$$

wherein g(t) is a waveform travelling at a certain distance $x_0$; F(w) is a frequency spectrum of an original A0-mode waveform at near or far receiver; w is angular frequency, −j is imaginary number; e is natural logarithm; H(w) is a propagation matrix, and k represents wavenumber; and due to dispersion, k is a function of phase velocity v of A0-mode waveforms.

In an embodiment, in step (S2), the two-dimensional migration velocity model is established through steps of:
setting grid spacing and model size; and
according to density and velocity of borehole fluid, steel casing, and cement in the target area, establishing the two-dimensional migration velocity model.

In an embodiment, in step (S3), the generation and storage of the forward propagating ultrasonic Lamb wavefield are performed through steps of:
selecting a Ricker wavelet as an ultrasonic source;
generating the forward propagating ultrasonic Lamb wavefield by using a high-order staggered grid finite difference algorithm;
absorbing and attenuating a reflection at an artificial boundary based on the non-split perfectly matched layer; and
storing the forward propagating ultrasonic Lamb wavefield for each time step.

In an embodiment, in step (S4), the reversely propagating ultrasonic Lamb wavefield is expressed through the following equation:

$$\rho\ddot{u}-(\lambda+2\mu)\nabla\nabla\cdot u+\mu\nabla\times\nabla\times u=d(x,z=0,T-t);$$

wherein d is actual ultrasonic Lamb waveforms measured by the receiver; ρ indicates density; u indicates the reversely propagating ultrasonic Lamb wavefield; ü is a second derivative of the reversely propagating ultrasonic Lamb wavefield with respect to time; ∇ represents the spatial derivative operation; ∇· represents an operation for solving divergence degree; ∇× represents an operation for solving curl; T is a total receiving time; t represents time step; and λ and μ are elastic parameters.

In an embodiment, in step (S5), the envelope of the forward propagating ultrasonic Lamb wavefield and the envelope of the reversely propagating ultrasonic Lamb wavefield are calculated by the following equation:

$$\hat{u}(t) = \frac{1}{\pi}\int_{-\infty}^{+\infty}\frac{u(\tau)}{t-\tau}d\tau;$$

wherein û indicates Hilbert transform of a wavefield u; τ is time delay; and an envelope ũ of a propagating wavefield is calculated based on a modulus of the Hilbert transform, expressed as:

$$\tilde{u}(t)=|\hat{u}(t)|;$$

wherein ‖ represents a modulo operation.

In an embodiment, in step (S6), the reverse time migration imaging results are expressed as follows:

$$I(z, x) = \int_0^T S(z, x, t)R(z, x, t)dt;$$

wherein S(z,x,t) is the envelope of the forward propagating ultrasonic Lamb wavefield at spatial position (z,x) in a $t^{th}$ time step; R(z,x,t) is the envelope of the reversely propagating ultrasonic Lamb wavefield at the spatial position (z,x) in the $t^{th}$ time step; and T indicates the number of sampling points.

In an embodiment, in step (S7), the Laplace filtering is expressed by the following equation:

$$\tilde{I}(z, x) = \nabla^2 I(z, x) = \frac{\partial^2 I(z, x)}{\partial z^2} + \frac{\partial^2 I(z, x)}{\partial x^2};$$

wherein I is an original reverse time migration imaging result; Ĩ is an imaging result after applying the Laplace filtering; z indicates a depth coordinate, and x indicates a distance coordinate; and the Laplace filtering is configured to highlight the high-frequency boundary by means of a second derivative of imaging with respect to space to eliminate low-frequency image noises.

Compared with the prior art, this application has the following benefits.

(1) With respect to the method proposed herein, the theoretical dispersion curve of the A0-mode waveforms is calculated to estimate the phase velocity of the measured A0-mode waveforms. In combination with the phase-shift interpolation method, the interpolation of the ultrasonic Lamb waveforms can be realized, such that the waveforms from the far and near receivers can be interpolated into array waveforms of multiple receivers, providing sufficient wavefields information for cased-hole reverse time migration based on ultrasonic pitch-catch measurements.

(2) Although the A0-mode wave is dispersive, the variation of its group velocity does not vary obviously in the target frequency range. In view of this, the method provided herein adopts the Hilbert transform to calculate the envelopes of the forward and reversely propagating ultrasonic Lamb wavefields, and applies the zero-lag cross-correlation imaging to the envelope, so as to suppress the image artifacts caused by the A0's dispersion, and obtain the imaged casing-cement interface and cement-formation interface. Therefore, this application can be further applied to evaluate the cementing bond quality.

DETAILED DESCRIPTION OF EMBODIMENTS

This application will be described in detail below with reference to the accompanying drawings and embodiments to make the technical solutions, objectives and beneficial effects of this application clearer.

Embodiment 1

Figure 1:
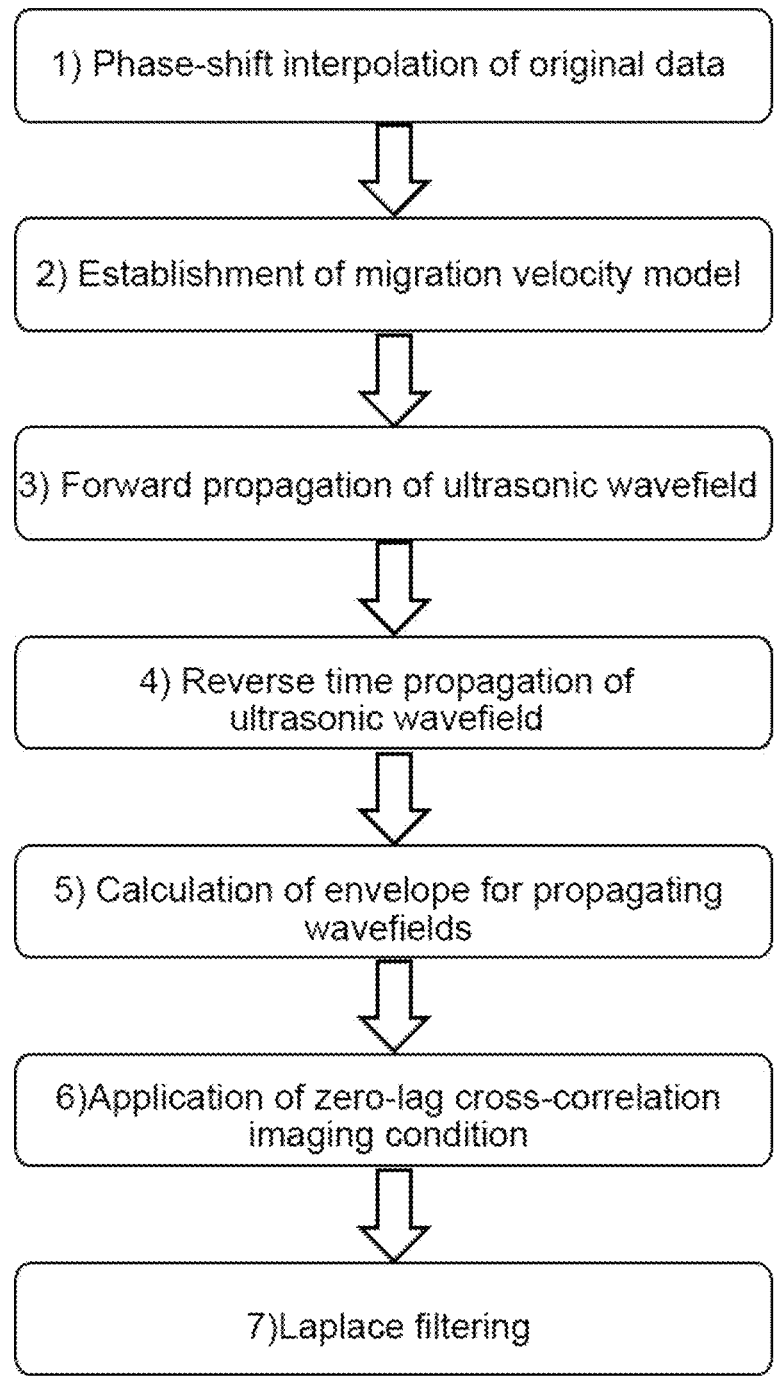
FIG. 1 is a flowchart of a cased-hole reverse time migration imaging method based on ultrasonic pitch-catch measurement according to an embodiment of this application.

Referring to an embodiment shown in FIG. 1, a reverse time migration imaging method for a cased-hole based on ultrasonic pitch-catch measurement is provided, which is performed as follows.

(S1) Original Data Input and Phase-Shift Interpolation of A0-Mode Wave

Original ultrasonic Lamb waveform data and parameters including borehole fluid velocity, casing thickness, casing longitudinal wave velocity, casing transverse wave velocity and central frequency are input. A theoretical dispersion curve of the A0-mode waveforms is calculated. Based on A0's phase velocity, a waveform propagating forward or backward from one of the two receivers to a certain distance is calculated by using a phase shift method through the following equation:

$$g(t) = \int F(w)H(w)e^{-jwt}dw$$

$$H(w) = e^{-jk(w)x_0};$$

where g(t) is a waveform travelling at a certain distance $x_0$; F(w) is a frequency spectrum of an original A0-mode waveform at a near or far receiver; w is angular frequency; $-j$ is imaginary number; e is natural logarithm; H(w) is a propagation matrix, and k represents wavenumber; and due to dispersion, k is a function of phase velocity v of the A0-mode waveforms.

Figure 2A:
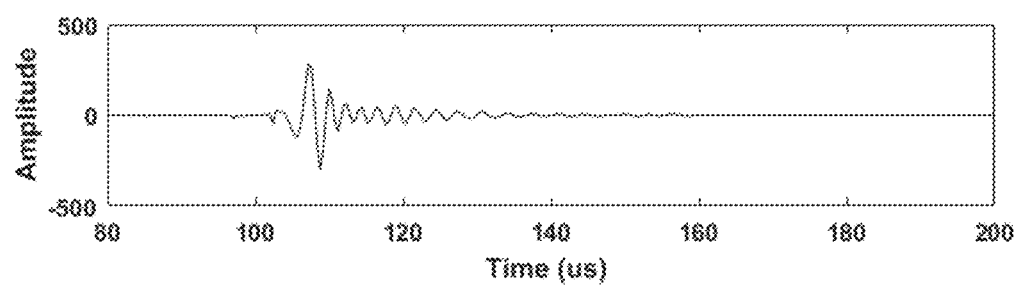
FIG. 2a is a schematic diagram of a measured waveform at a near receiver for ultrasonic pitch-catch measurement.
Figure 2B:
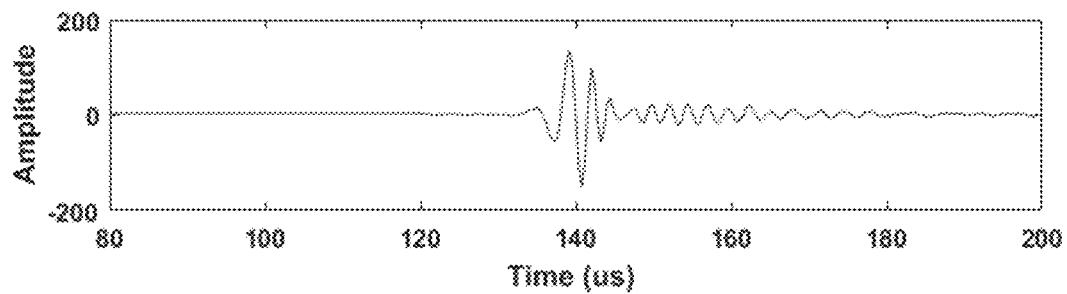
FIG. 2b is a schematic diagram of a measured waveform at a far receiver for ultrasonic pitch-catch measurement.
Figure 3:
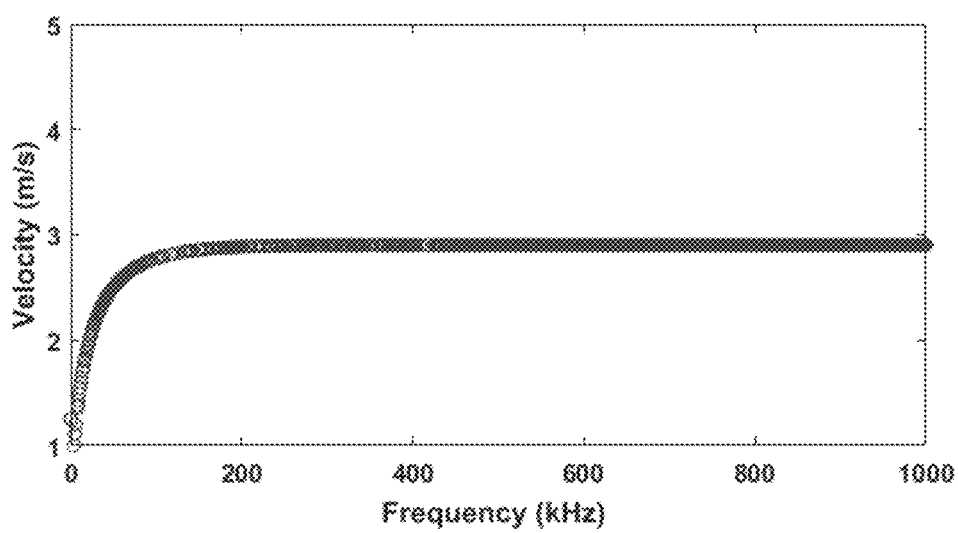
FIG. 3 shows a theoretical dispersion curve of A0-mode waveform.
Figure 4:
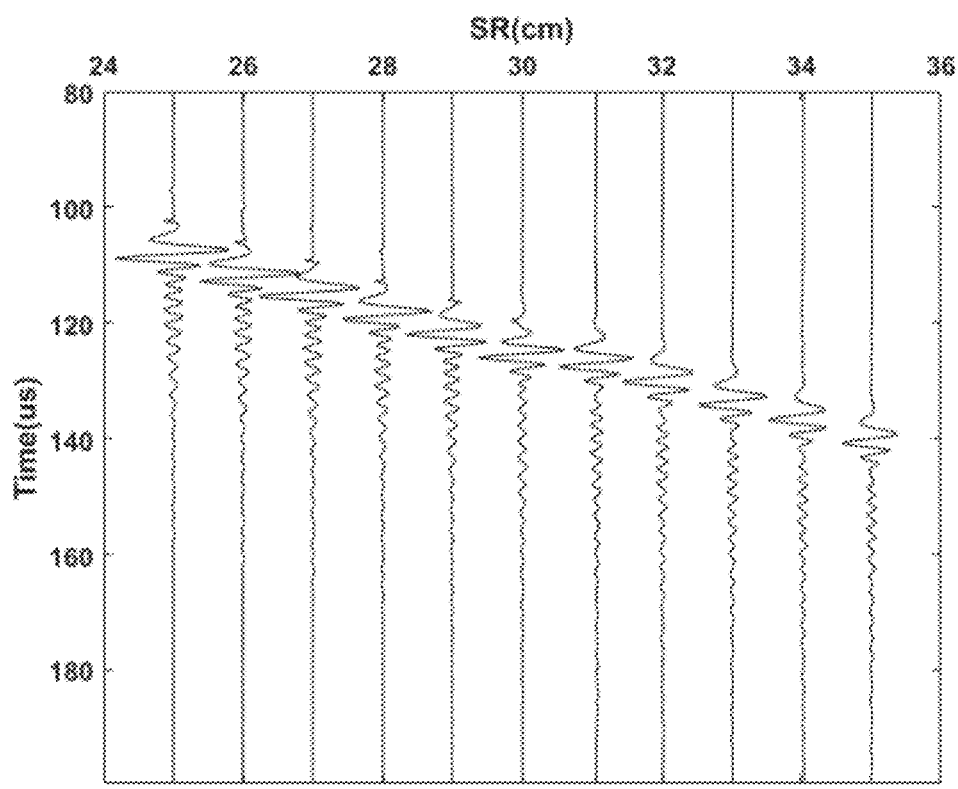
FIG. 4 shows the array A0-mode waveform obtained based on phase-shift interpolation.

FIG. 2a is a schematic diagram of a measured waveform at a near receiver for the ultrasonic pitch-catch measurement. FIG. 2b is a schematic diagram of a measured waveform at a far receiver for the ultrasonic pitch-catch measurement. FIG. 3 shows a theoretical dispersion curve of A0-mode waveforms. FIG. 4 shows the array waveform obtained based on phase-shift interpolation.

(S2) Establishment of Two-Dimensional Migration Velocity Model

Figure 5:
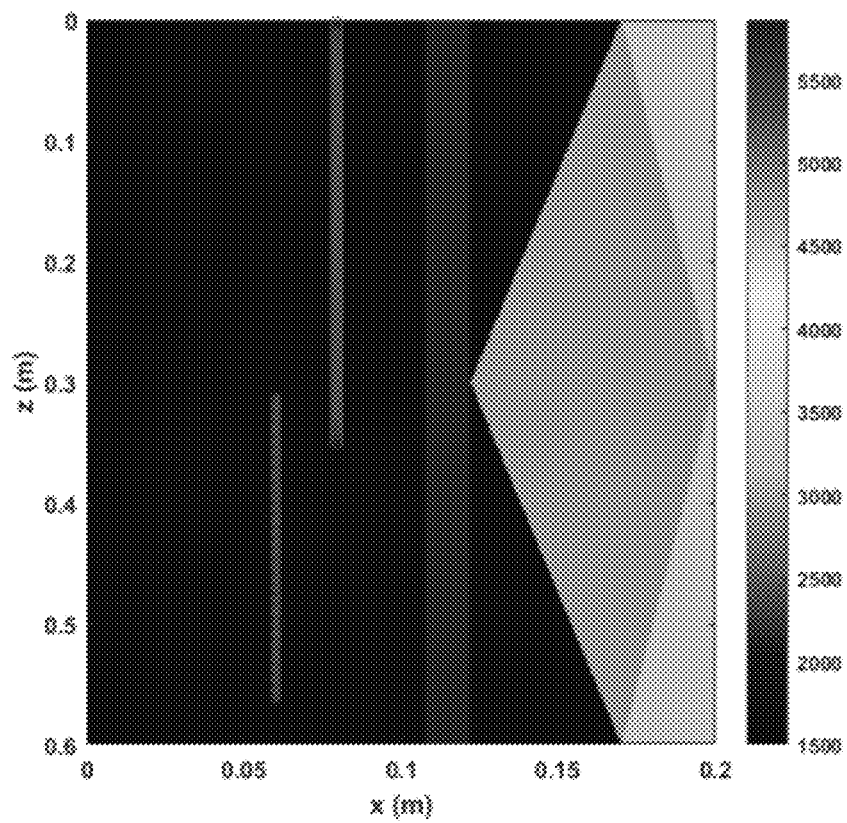
FIG. 5 illustrates the forward velocity model used in synthetic case study.

Grid spacing and model size are set. According to density and velocity of borehole fluid, steel casing and cement in the target area, the two-dimensional migration velocity model is established. FIG. 5 illustrates the forward velocity model used in synthetic case study.

(S3) Generation and Storage of Forward Propagating Ultrasonic Lamb Wavefield

A Ricker wavelet is selected as an ultrasonic source. The forward propagating ultrasonic Lamb wavefield is generated by using a high-order staggered grid finite difference algorithm. The reflection at an artificial boundary is absorbed and attenuated based on the non-split perfectly matched layer, and the forward propagating ultrasonic Lamb wavefield for each time step is stored.

(S4) Generation and Storage of Reversely Propagating Ultrasonic Lamb Wavefield

A time axis is reversed, and a reversely propagating ultrasonic Lamb wavefield is generated and stored, which is expressed through the following equation:

$$\rho \ddot{u} - (\lambda + 2\mu) \nabla \nabla \cdot u + \mu \nabla \times \nabla \times u = d(x, z=0, T-t);$$

where d is actual ultrasonic Lamb waveforms measured by the receivers; ρ indicates density; u indicates the reversely propagating ultrasonic Lamb wavefield; ü is a second derivative of the reversely propagating ultrasonic Lamb wavefield with respect to time; ∇ represents the spatial derivative operation; ∇· represents an operation for solving divergence degree; ∇× represents an operation for solving curl; T is a total receiving time; t represents time step; and λ and μ are elastic parameters.

(S5) Calculation of Envelops of the Forward Propagating Ultrasonic Lamb Wavefield and the Reversely Propagating Ultrasonic Lamb Wavefield Based on Hilbert transform, envelopes of the forward propagating ultrasonic Lamb wavefield and the reversely propagating ultrasonic Lamb wavefield are calculated by the following equation:

$$\hat{u}(t) = \frac{1}{\pi} \int_{-\infty}^{+\infty} \frac{u(\tau)}{t - \tau} d\tau;$$

where $\hat{u}$ indicates Hilbert transform of a wavefield u; τ is time delay; and an envelope $\tilde{u}$ of a propagating wavefield is calculated based on a modulus of the Hilbert transform, expressed as:

$$\tilde{u}(t) = |\hat{u}(t)|;$$

where ‖ represents a modulo operation.

Figure 6:
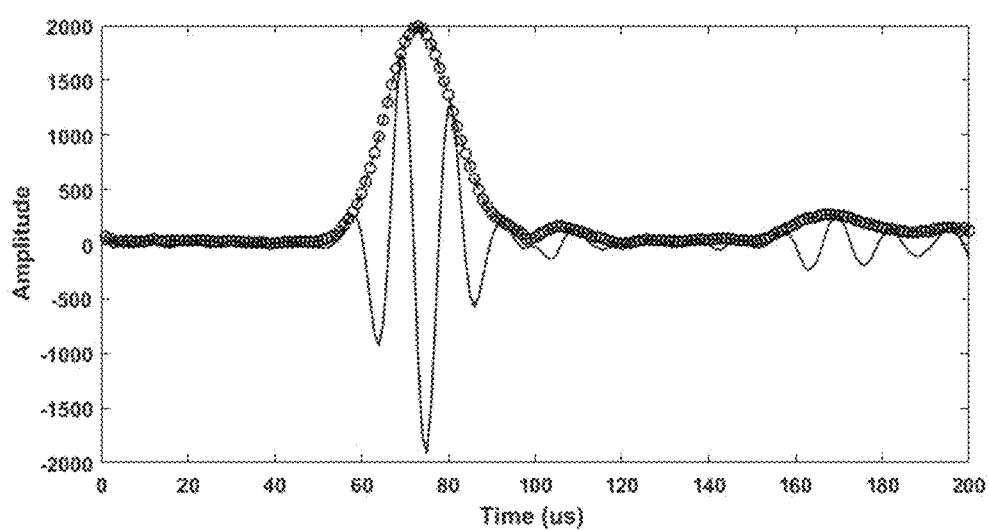
FIG. 6 depicts the measured ultrasonic Lamb waveform at the far receiver at a certain depth point and its envelope calculated using Hilbert transform.

FIG. 6 depicts the measured ultrasonic Lamb waveform at the far receiver at a certain depth point and its envelope calculated using Hilbert transform.

(S6) Application of Reverse Time Migration Imaging Condition

A zero-lag cross-correlation imaging condition is applied to the forward propagating ultrasonic Lamb wavefield and the reversely propagating ultrasonic Lamb wavefield to obtain reverse time migration imaging results for the ultrasonic pitch-catch measurement, expressed as follows:

$$I(z, x) = \int_0^T S(z, x, t) R(z, x, t) dt;$$

where S(z,x,t) is the envelope of the forward propagating ultrasonic Lamb wavefield at spatial position (z,x) in a $t^{th}$ time step; R(z,x,t) is the envelope of the reversely propagating ultrasonic Lamb wavefield at the spatial position (z,x) in the $t^{th}$ time step; and T indicates the number of sampling points.

(S7) Laplace Filtering

The Laplace filtering is applied to suppress low-frequency imaging noises in the reverse time migration imaging results, where the Laplace filtering is expressed as:

$$\tilde{I}(z, x) = \nabla^2 I(z, x) = \frac{\partial^2 I(z, x)}{\partial z^2} + \frac{\partial^2 I(z, x)}{\partial x^2};$$

where I is an original reverse time migration imaging result; $\tilde{I}$ is an imaging result after applying the Laplace filtering; z indicates a depth coordinate, and x indicates a distance coordinate.

The Laplace filtering is configured to highlight the high-frequency boundary by means of a second derivative of imaging with respect to space to eliminate low-frequency image noises.

In order to verify that the reverse time migration imaging method provided herein has better imaging effect of the cased-hole structure acoustic interface, the simulated ultrasonic pitch-catch measurement data and the measured ultrasonic Lamb wave calibration well data are respectively subjected to trial calculation, as shown in Embodiment 2 and Embodiment 3.

Embodiment 2

In this embodiment, the ultrasonic pitch-catch measurement data are simulated through the following steps.

(1) The ultrasonic pitch-catch measurement simulated wavefield record (SimulatedLamb.dat) is read in. The borehole fluid velocity, borehole fluid density, casing density, casing P-wave velocity, casing S-wave velocity, cement density, cement P-wave velocity, cement S-wave velocity, formation density, formation P-wave velocity and formation S-wave velocity are input.

(2) A theoretical dispersion curve of the A0-mode waveforms is calculated. The original Lamb data of two receivers is expanded into array waveform data based on phase-shift interpolation.

(3) The grid spacing and the model size are set to establish an initial velocity model of the target area.

(4) Based on the two-dimensional high-order staggered grid finite difference and the non-split perfectly matched layer, a forward propagating ultrasonic Lamb wavefield and a reversely propagating ultrasonic Lamb wavefield for each time step are generated and stored.

(5) Based on the Hilbert transform, envelopes of the forward propagating ultrasonic Lamb wavefield and the reversely propagating ultrasonic Lamb wavefield are calculated.

(6) A zero-lag cross-correlation imaging condition is applied to obtain reverse time migration imaging results, and then the Laplace filtering is applied to suppress low-frequency imaging noises in the reverse time migration imaging results.

Figure 7:
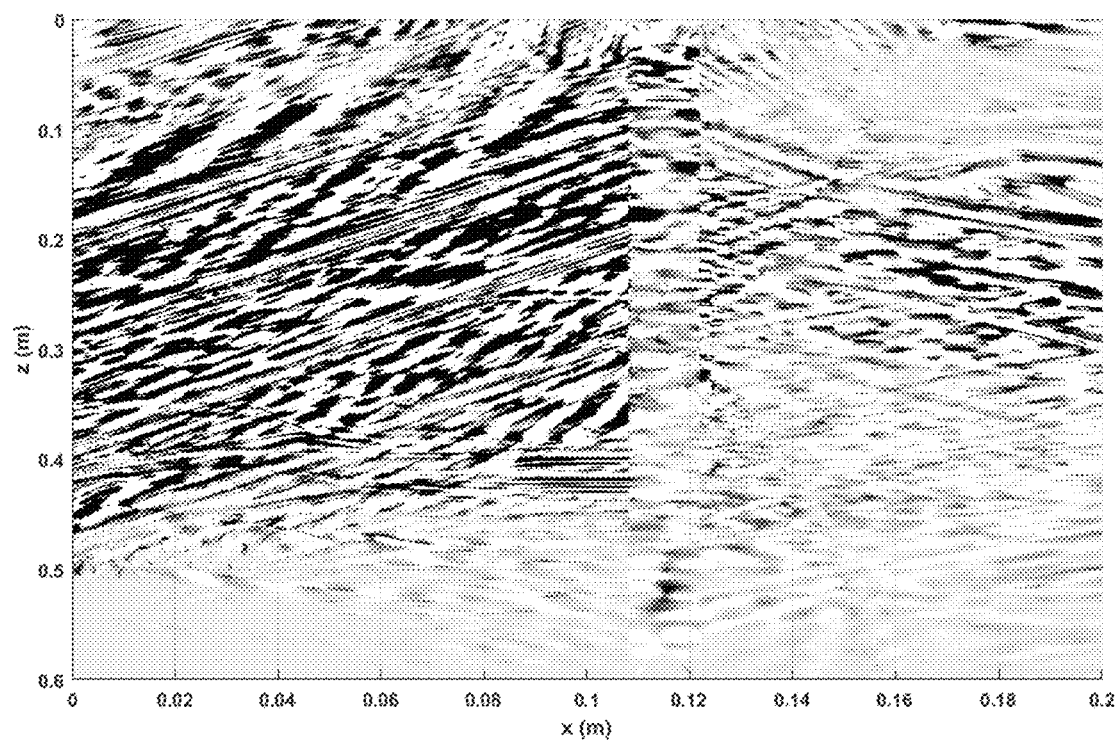
FIG. 7 shows reverse time migration imaging results using the zero-lag cross-correlation imaging condition for the simulated ultrasonic pitch-catch measurement data.
Figure 8:
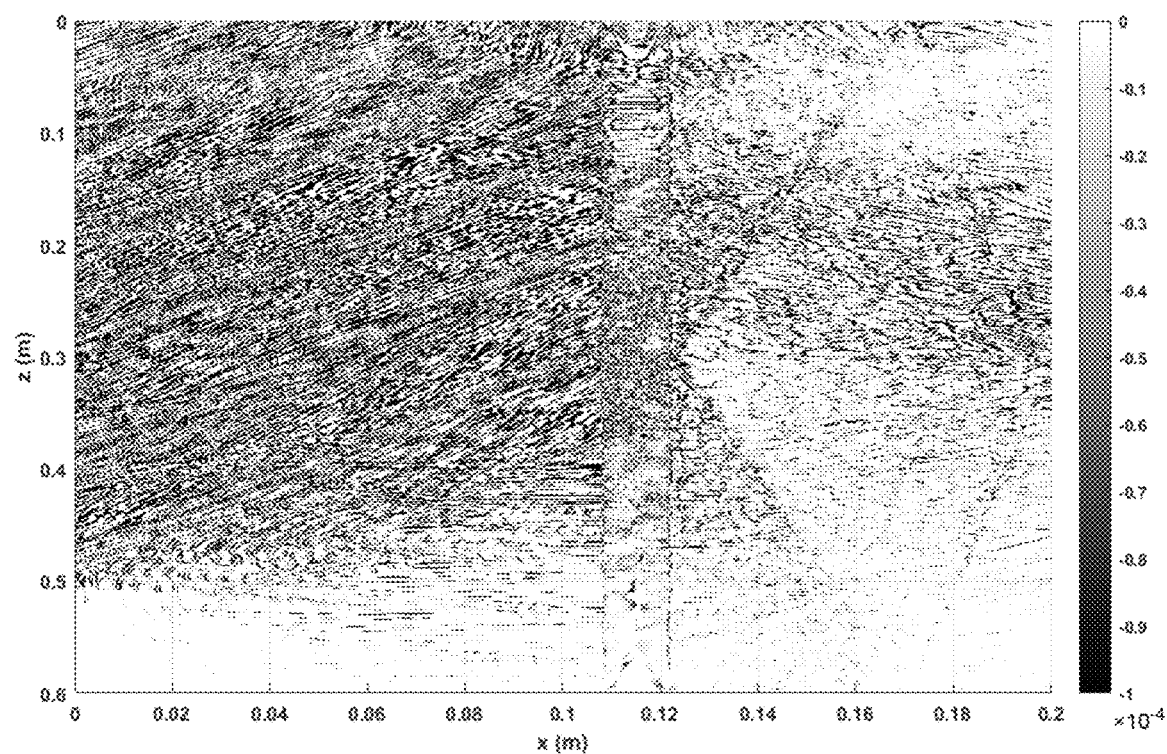
FIG. 8 schematically illustrates the enhanced imaging results obtained by applying Laplace filtering algorithm.

FIG. 7 shows reverse time migration imaging results using the zero-lag cross-correlation imaging condition for the simulated ultrasonic pitch-catch measurement data. The casing interface can be clearly observed, but the imaging of the casing-cement interface, and the cement-formation interface are not clear enough. FIG. 8 schematically illustrates the enhanced imaging results obtained by applying the Laplace filtering algorithm. The casing position, and the imaging of the casing-cement interface and the cement-formation interface can be clearly observed in FIG. 8, and the imaging results are highly consistent with the forward model, verifying the effectiveness of the method provided herein.

Embodiment 3

In this embodiment, ultrasonic Lamb wave calibration well data are measured as follows.

(1) The ultrasonic measurement data for a calibration well is read in. The velocity and density of a borehole fluid, casing density, casing P-wave velocity, casing S-wave velocity, cement density, cement P-wave velocity, cement S-wave velocity, formation density, formation P-wave velocity and formation S-wave velocity are input.

(2) A theoretical dispersion curve of the A0-mode waveforms is calculated, and the original Lamb wave data of the two receivers is expanded into array waveform data.

(3) The grid spacing and the model size are set to establish the initial velocity model of the target area.

(4) Based on the two-dimensional high-order staggered grid finite difference and the non-split perfectly matched layer, a forward propagating ultrasonic Lamb wavefield is generated and stored for each time step, and a reversely propagating ultrasonic Lamb wavefield for the two receivers after phase-shift interpolation is generated and stored.

(5) Based on the Hilbert transform, envelopes of the forward propagating ultrasonic Lamb wavefield and the reversely propagating ultrasonic Lamb wavefield are calculated.

(6) A zero-lag cross-correlation imaging condition is applied to obtain reverse time migration imaging results, and then the Laplace filtering is applied to suppress low-frequency imaging noises in the reverse time migration imaging results.

Figure 9:
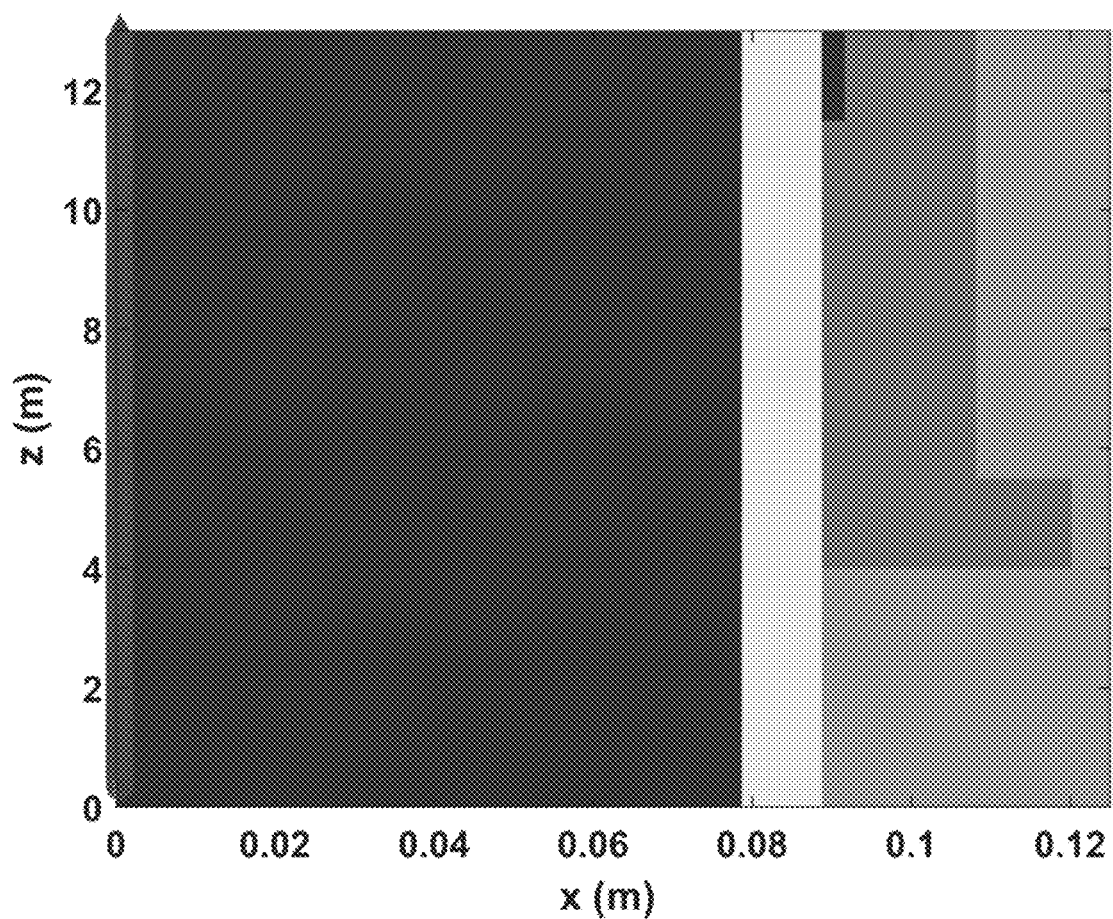
FIG. 9 illustrates the established migration velocity model for the cased-hole reverse time migration in a calibration well.
Figure 10:
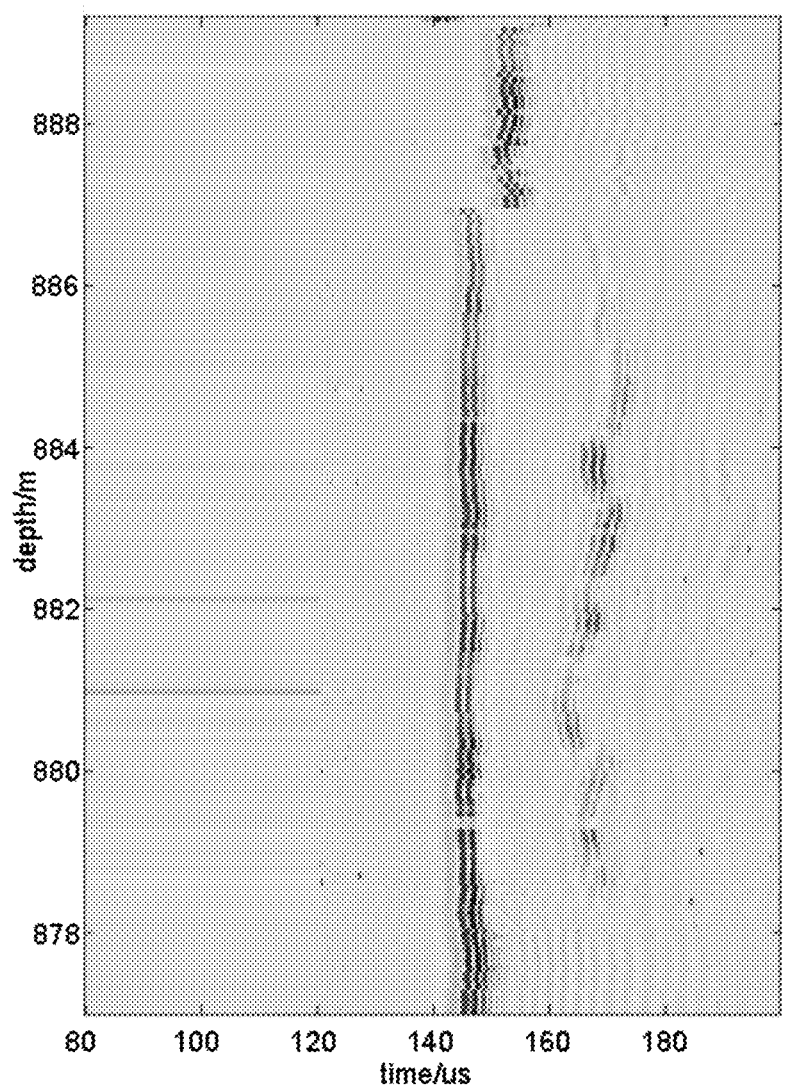
FIG. 10 shows the measured time-depth waveform at the near receiver for the ultrasonic pitch-catch measurement in the calibration well.
Figure 11:
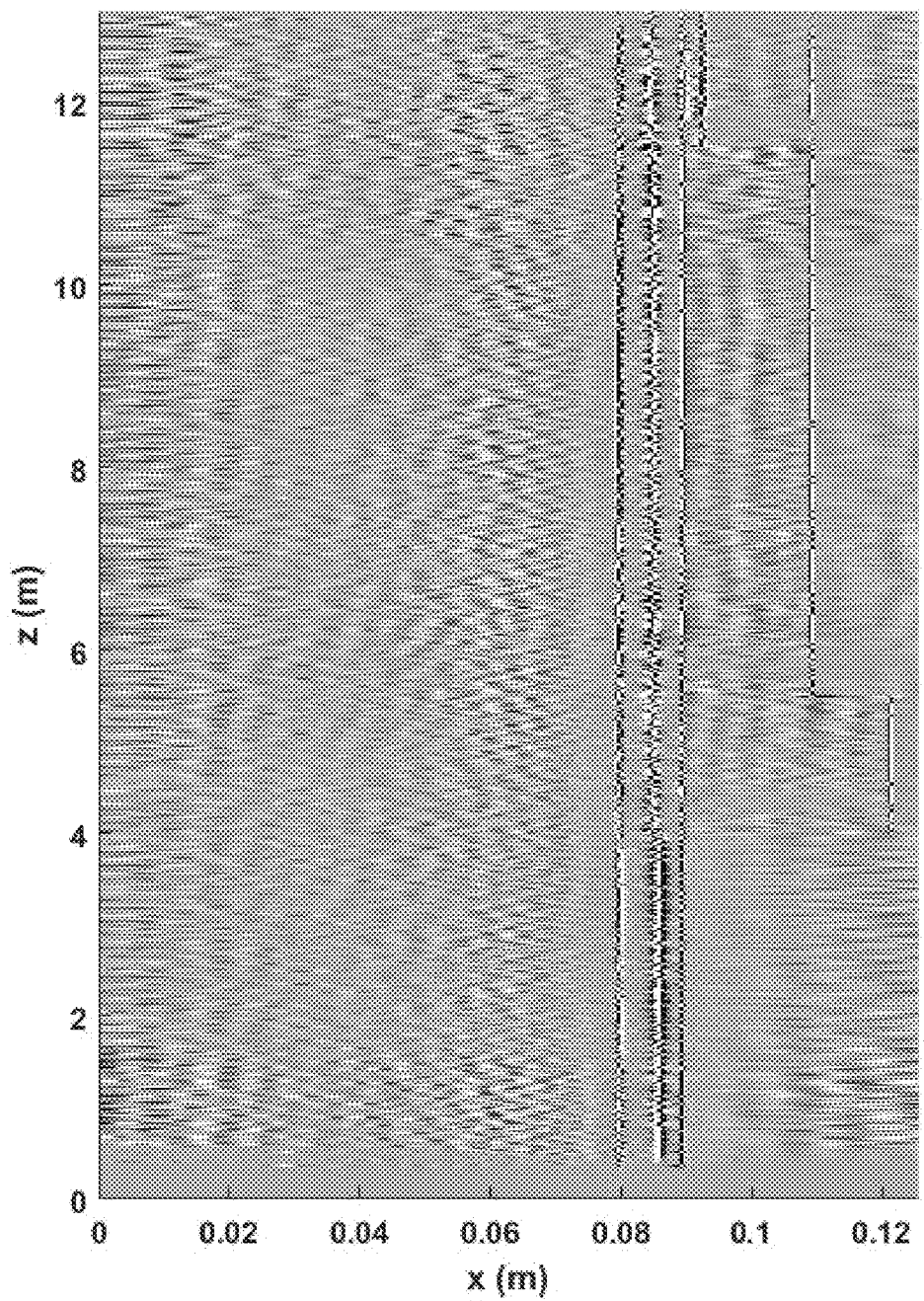
FIG. 11 illustrates the final reverse time migration imaging result for the measured ultrasonic pitch-catch measurement data in the calibration well.

FIG. 9 is a schematic diagram of the established velocity model for the cased-hole reverse time migration in a calibration well. FIG. 10 shows the measured time-depth waveform at the near receiver for the ultrasonic pitch-catch measurement in the calibration well. FIG. 11 is a schematic diagram of the final reverse time migration imaging result for the measured ultrasonic pitch-catch measurement data of the calibration well. Referring to FIGS. 9-11, the casing position and the imaging of the casing-cement interface and the cement-formation interface can be clearly seen, and the imaging results are highly consistent with the forward model, verifying the effectiveness of the method provided herein.

In conclusion, with respect to the reverse time migration imaging method provided in this embodiment, the original waveform data of the two receivers are expanded into array waveforms by phase-shaft interpolation, and the envelopes of the forward propagating ultrasonic Lamb wavefield and the reversely propagating ultrasonic Lamb wavefield are calculated based on the Hilbert transform, so as to suppress the image artifacts caused by the A0's dispersion. Moreover, the method provided herein allows the A0-mode reflection waves and diffraction waves to converge to their real positions, which is not affected by the interface inclined angle, casing eccentricity and tool eccentricity, enabling the accurate imaging of the casing, the casing-cement interface, and the cement-formation interface, and the reliable cementing quality evaluation.

Described above are basic principles, technical features and beneficial effects of this application. It should be understood that the above embodiments are merely illustrative of this application, and are not intended to limit this application. It should be noted that various changes and modifications made by those skilled in the art without departing from the spirit and scope of this application shall fall within the scope of this application defined by the appended claims.

What is claimed is:

1. A reverse time migration imaging method for a cased-hole structure based on ultrasonic pitch-catch measurement, comprising:

inputting original ultrasonic Lamb waveform data and related parameter files; calculating a theoretical dispersion curve of A0-mode waveforms according to borehole fluid properties, casing thickness, casing elastic parameters and central frequency recorded in the related parameter files; and obtaining a waveform propagating forward or backward from one of two receivers to a certain distance based on A0's phase velocity by using a phase shift method through the following equation:

$$g(t) = \int F(w)H(w)e^{-jwt}dw$$
$$H(w) = e^{-jk(w)x_0};$$

wherein g(t) is a waveform travelling at a certain distance $x_0$; F(w) is a frequency spectrum of an original A0-mode waveform at near or far receiver; w is angular frequency; −j is imaginary number; e is natural logarithm; H(w) is a propagation matrix; and k represents wavenumber; and due to dispersion, k is a function of phase velocity v of the A0-mode waveforms;

establishing, according to background information, a two-dimensional migration velocity model including initial density, P-wave velocity and S-wave velocity of a target area;

generating and storing a forward propagating ultrasonic Lamb wavefield based on two-dimensional high-order staggered grid finite difference and non-split perfectly matched layer;

reversing a time axis of the forward propagating ultrasonic Lamb wavefield to generate a reversely propagating ultrasonic Lamb wavefield; and storing the reversely propagating ultrasonic Lamb wavefield;

calculating, based on Hilbert transform, an envelope of the forward propagating ultrasonic Lamb wavefield and an envelope of the reversely propagating ultrasonic Lamb wavefield;

applying a zero-lag cross-correlation imaging condition to the forward propagating ultrasonic Lamb wavefield and the reversely propagating ultrasonic Lamb wavefield to obtain reverse time migration imaging results for ultrasonic pitch-catch measurement; and applying Laplace filtering to suppress low-frequency imaging noises in the reverse time migration imaging results.

2. The reverse time migration imaging method of claim 1, wherein the two-dimensional migration velocity model is established through steps of:

setting grid spacing and model size; and according to density and velocity of borehole fluid, steel casing, and cement in the target area, establishing the two-dimensional migration velocity model.

3. The reverse time migration imaging method of claim 1, wherein the generation and storage of the forward propagating ultrasonic Lamb wavefield are performed through steps of:

selecting a Ricker wavelet as an ultrasonic source;

generating the forward propagating ultrasonic Lamb wavefield by using a high-order staggered grid finite difference algorithm;

absorbing and attenuating a reflection at an artificial boundary based on the non-split perfectly matched layer; and storing the forward propagating ultrasonic Lamb wavefield.

4. The reverse time migration imaging method of claim 1, wherein the reversely propagating ultrasonic Lamb wavefield is expressed through the following equation:

$$\rho \ddot{u} - (\lambda + 2\mu)\nabla\nabla\cdot u + \mu\nabla\times\nabla\times u = d(x, z=0, T-t);$$

wherein d is actual ultrasonic Lamb waveforms measured by the receiver; ρ indicates density; u indicates the reversely propagating ultrasonic Lamb wavefield; ü is a second derivative of the reversely propagating ultrasonic Lamb wavefield with respect to time; ∇ represents a spatial derivative operation; ∇· represents an operation for solving divergence degree; ∇× represents an operation for solving curl; T is a total receiving time; t represents time step; and λ and μ are elastic parameters.

5. The reverse time migration imaging method of claim 1, wherein the envelope of the forward propagating ultrasonic Lamb wavefield and the envelope of the reversely propagating ultrasonic Lamb wavefield are calculated by the following equation:

$$\hat{u}(t) = \frac{1}{\pi}\int_{-\infty}^{+\infty}\frac{u(\tau)}{t-\tau}d\tau;$$

wherein $\hat{u}$ indicates Hilbert transform of a wavefield u; $\tau$ is time delay; and an envelope $\tilde{u}$ of a propagating wavefield is calculated based on a modulus of the Hilbert transform, expressed as:

$$\tilde{u}(t)=|\hat{u}(t)|;$$

wherein $\|$ represents a modulo operation.

6. The reverse time migration imaging method of claim 1, wherein the reverse time migration imaging results are expressed as follows:

$$I(z,x) = \int_0^T S(z,x,t)R(z,x,t)dt;$$

wherein S(z,x,t) is the envelope of the forward propagating ultrasonic Lamb wavefield at spatial position (z,x) in a $t^{th}$ time step; R(z,x,t) is the envelope of the reversely propagating ultrasonic Lamb wavefield at the spatial position (z,x) in the $t^{th}$ time step; and T indicates the number of sampling points.

7. The reverse time migration imaging method of claim 1, wherein the Laplace filtering is expressed as:

$$\tilde{I}(z,x) = \nabla^2 I(z,x) = \frac{\partial^2 I(z,x)}{\partial z^2} + \frac{\partial^2 I(z,x)}{\partial x^2};$$

wherein I is an original reverse time migration imaging result; $\tilde{I}$ is an imaging result after applying the Laplace filtering; z indicates a depth coordinate, and x indicates a distance coordinate.

* * * * *